Aug. 17, 1937.  S. W. WALLACE  2,090,083
PALETTE
Filed Jan. 22, 1937
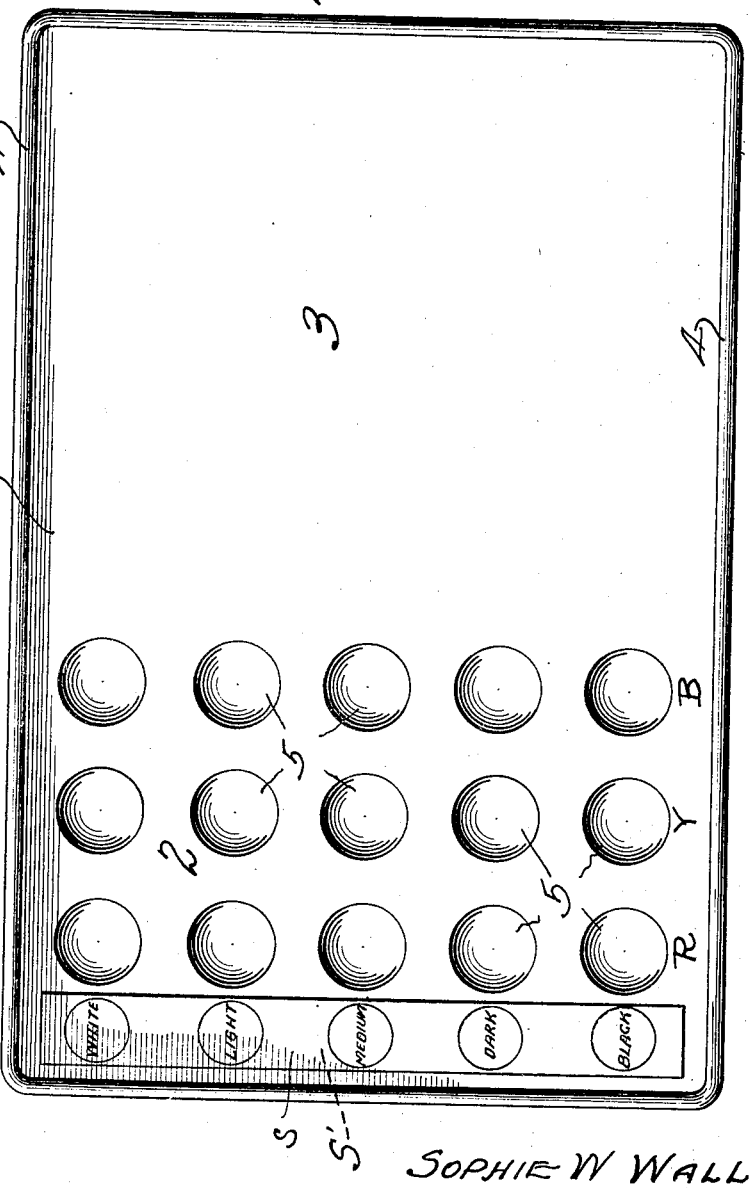
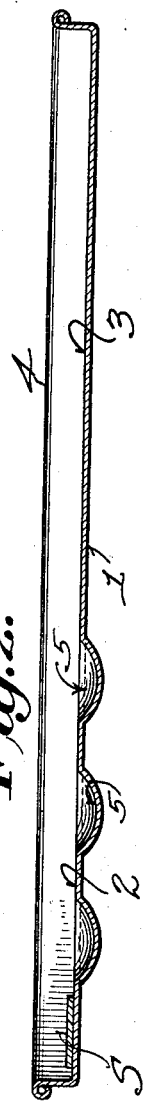
Sophie W Wallace Patented Aug. 17, 1937

2,090,083

UNITED STATES PATENT OFFICE 2,090,083

PALETTE

Sophie Willis Wallace, Spartanburg, S. C.

Application January 22, 1937, Serial No. 121,864

3 Claims. (Cl. 41—5)

This invention relates to educational appliances and more particularly to a palette for use by art students.

A primary object of the invention is to provide a palette for assisting and guiding students in mixing paints to produce the desired shade of color values for a given subject. That is to say, the invention contemplates a palette having a series of receptacles so arranged in parallel series, that is in vertical rows or columns for selected colors, each receptacle being adapted to receive a different shade of the same color in accordance with a predetermined scale of color values.

A further object of the invention is to provide a palette having a series of paint receiving receptacles at one side and a mixing panel adjacent thereto, the entire area embracing the receptacles and the mixing panels being provided with an upstanding rim or flange. A palette of this type has the advantage that students working with oil colors can partially fill the panel-like pan with water at the end of the period of use and permit the colors to remain fresh and available for the next period of use.

A preferred and practical embodiment of the invention is shown in the accompanying drawing in which:

Figure 1 is a plan view of a palette constructed in accordance with the present invention.

Figure 2 is a longitudinal cross-section view of the pan shown in Figure 1.

Figure 3 is a plan view of a scale of color values intended to be used in connection with the paint receiving receptacles to indicate color values in terms of different shades of light.

Similar reference characters designate corresponding parts throughout the several figures of the drawing.

According to the embodiment of the invention shown in the drawing, the same includes in its organization a palette comprising a body 1 including a receptacle portion 2 and a mixing panel 3, the said body being provided around its marginal edge portion with an upstanding rim or flange 4. The receptacle portion 2 is provided with a plurality of receptacles 5 arranged in vertical rows or columns designated as R, Y and B. The number of receptacles 5 in each of the columns corresponds to the number of color values of a given color expressed in terms of different shades of light carried by a value scale S shown in Figure 3. This value scale is preferably a strip of suitable material having thereon suitable legends indicating the extreme shades of color expressed in terms of lightness and darkness, namely "white" and "black", together with intermediate shades such as "light"; "medium" and "dark". It will, therefore, be apparent that the number of receptacles in each column may correspond to the number of values on the value scale S, or where more advanced students are working with color values which require different shades of light, more or less receptacles may be used within the scope of the teaching of the present invention. For example, if a student is working with a subject which will require shades intermediate "white" and "black" such as "high light"; "light"; "low light"; "medium"; "high dark"; "dark"; "low dark", then the number of the receptacles on the pan will be increased accordingly; or on the other hand if the particular subject being executed contains color values arranging from "medium" to "white", it will be apparent that a scale containing the legends "medium"; "low light"; "light"; "high light"; and "white" may be used with a pan having as many receptacles as required by the particular scale.

The value scale S is, therefore, changeable and replaceable with respect to the seat S' formed at one side of the group of receptacles on the body of the palette depending on the grade of the student and the subject for execution. However, the arrangement of the receptacles 5 remains the same for various value scales.

According to the form of the invention illustrated, the student would place, for example, the primary colors "red"—"yellow"—"blue" in the lowermost receptacles of each of the columns R, Y and B. The original forms of colors in the lowermost horizontal row would correspond to "black" on the value scale. The value scale S may then be laid on the seat S', to one side of the receptacles to serve as a guide for mixing different values of the several colors or pigments to be mixed by the artist from the base colors. In the ascending order of each vertical column, the receptacles will contain lighter shades of the same color, that is, the color in the receptacle at the bottom of the column. Thus, in the same way that the lowermost horizontal row of receptacles will contain the darkest of the several colors being used, it will, of course, be understood that each horizontal or transverse ascending row of receptacles will contain different colors but of the same light value.

The palette body may be made of metal or other suitable material and is preferably made in such form that it may be expeditiously and economically made, as, for example, by stamping and although the receptacles 5 are shown as being made integral with the body, in the form of depressions, nevertheless, it will be understood that they may be made separately as cups and secured in any suitable manner to the body. In either case the tops of the receptacles are preferably flush with the mixing panel 3.

From the foregoing it will be apparent that the distinctive feature of the invention resides in the provision of a palette including a mixing panel and a plurality of receptacles arranged in spaced vertical rows or columns as well as horizontal or transverse rows whereby the vertical rows may receive different shades of the same color and the horizontal rows may contain the same shade of different colors. Also the palette is provided with a rim which permits of covering the oil colors or pigments with water to preserve them for subsequent use.

Without further description it is thought that the features of the invention will be readily understood by those skilled in the art, and it will, of course, be understood that changes in the shape and form of the palette may be resorted to within the scope of the appended claims:

I claim:

1. A palette comprising a one-piece body having a surface providing a paint mixing panel and also having a plurality of paint receiving receptacles located between the middle and one end of the body, said receptacles being spaced apart in parallel rows across one dimension of the panel, and an upstanding rim on the body surrounding the panel and the area containing the receptacles to form a pan to receive water for submerging the receptacles.

2. A palette comprising a substantially rigid one-piece body having long and short sides and including a paint mixing panel, a plurality of paint receiving receptacles located between the middle and one of the short sides of the body, said receptacles being spaced apart and arranged in rows extending substantially from one of the long sides of the panel to the other, and an upstanding flange surrounding the outer edge of the body providing a pan for receiving water to submerge said receptacles.

3. A palette comprising, in combination, a one-piece body having a paint mixing panel, a plurality of paint receiving receptacles located at one side of said panel, a value scale, a seat on the body at one side of the receptacles for receiving said value scale, said receptacles being spaced apart and arranged in vertical and horizontal rows, said receptacles in the vertical rows adapted to receive different values of the same color expressed in different shades of light, and said receptacles in the horizontal rows receiving different colors of the same value expressed in shade of light in accordance with the value scale placed on said seat.

SOPHIE WILLIS WALLACE.